United States Patent [19]

Bellomy et al.

[11] Patent Number: 5,371,121

[45] Date of Patent: Dec. 6, 1994

[54] BITUMEN COMPOSITIONS CONTAINING BITUMEN, POLYMER AND SULFUR

[75] Inventors: Robert C. Bellomy, Concord; Edgar L. McGinnis, Moraga, both of Calif.

[73] Assignee: Chevron Research and Technology Company, San Francisco, Calif.

[21] Appl. No.: 81,908

[22] Filed: Jun. 23, 1993

Related U.S. Application Data

[63] Continuation of Ser. No. 769,915, Sep. 30, 1991, abandoned.

[51] Int. Cl.$^5$ .............................................. C08L 95/00
[52] U.S. Cl. ...................................... 524/68; 524/71; 524/439
[58] Field of Search .................... 524/71, 68, 439; 525/332.6, 54.5

[56] References Cited

U.S. PATENT DOCUMENTS

| | | | |
|---|---|---|---|
| H876 | 12/1991 | Gilmore | 524/68 |
| 3,634,293 | 1/1972 | Bonitz | 260/28.5 |
| 3,803,066 | 4/1974 | Petrossi | 260/28.5 |
| 3,810,857 | 5/1974 | Garrigues | 260/28 |
| 3,963,659 | 6/1976 | Binder et al. | 260/28.5 |
| 3,992,340 | 11/1976 | Bonitz | 524/71 |
| 4,130,516 | 12/1978 | Gagle et al. | 260/28.5 |
| 4,145,322 | 3/1979 | Maldonado et al. | 260/28.5 |
| 4,154,710 | 5/1979 | Maldonado et al. | 260/28.5 |
| 4,237,052 | 12/1980 | Fitoussi et al. | 260/28.5 |
| 4,242,246 | 12/1980 | Maldonado et al. | 260/28.5 |
| 4,330,449 | 5/1982 | Maldonado | 524/68 |
| 4,554,313 | 11/1985 | Hagenbach et al. | 525/54.5 |
| 4,567,222 | 1/1986 | Hagenbach et al. | 524/476 |
| 4,745,155 | 5/1988 | Grossi | 524/71 |
| 5,120,777 | 6/1992 | Chaverot | 524/68 |

OTHER PUBLICATIONS

Kraus, Rubber Chemistry and Technology, vol. 55, No. 5, pp. 1389–1402 (1982).
Kraus, Roofs and Roofing, pp. 19–30 (1981).

*Primary Examiner*—Paul R. Michl
*Assistant Examiner*—LaVonda R. DeWitt
*Attorney, Agent, or Firm*—J. A. Scholten; J. A. Hagenah; W. K. Turner

[57] ABSTRACT

Disclosed are asphalt compositions prepared from bitumen, a tri-block copolymer of styrene and butadiene, and from about 0.015 to about 0.075 weight percent of elemental sulfur. The asphalt compositions described herein are useful in industrial applications, such as in hot mix asphalts useful in preparing aggregates for road paving.

20 Claims, No Drawings

BITUMEN COMPOSITIONS CONTAINING BITUMEN, POLYMER AND SULFUR

CROSS-REFERENCE TO RELATED APPLICATIONS

This application is a continuation of U.S. Ser. No. 07/769,915, filed Sep. 30, 1991, now abandoned.

BACKGROUND OF THE INVENTION

1. Field of the Invention

This invention is directed to bitumen compositions which are prepared from bitumen, a tri-block copolymer of styrene and a conjugated-diene, and defined amounts of sulfur. The bitumen compositions described herein are useful in industrial applications, such as in hot mix asphalts useful in preparing aggregates for road paving.

2. State of the Art

The use of bitumen (asphalt) compositions in preparing aggregate compositions (bitumen +rock) useful as road paving material is complicated by at least three factors, each of which imposes a serious impediment to providing an acceptable product. Firstly, the bitumen compositions must meet certain performance criteria or specifications in order to be considered useful for road paving. For example, to ensure acceptable performance, state and federal agencies issue specifications for various bitumen applications including specifications for use as road pavement. Current Federal Highway Administration specifications designate a bitumen (asphalt) product AC-20R as meeting defined parameters relating to properties such as viscosity, toughness, tenacity and ductility. Each of these parameters define a critical feature of the bitumen composition and compositions failing to meet one or more of these parameters will render that composition unacceptable for use as road pavement material.

Conventional bitumen compositions frequently cannot meet all of the requirements of a particular specification simultaneously and, if these specifications are not met, damage to the resulting road can occur, including permanent deformation, thermally-induced cracking and flexural fatigue. This damage greatly reduces the effective life of paved roads.

In this regard, it has long been recognized that the properties of conventional bitumen compositions can be modified by the addition of other substances, such as polymers. A wide variety of polymers have been used as additives in bitumen compositions. For example, copolymers derived from styrene and conjugated dienes, such as butadiene or isoprene, are particularly useful, since these copolymers have good solubility in bitumen compositions and the resulting modified-bitumen compositions have good rheological properties.

It is also known that the stability of polymer-bitumen compositions can be increased by the addition of sulfur, frequently in the form of elemental sulfur. It is believed that the sulfur chemically couples the polymer and the bitumen through sulfide and/or poly-sulfide bonds. The addition of extraneous sulfur is required to produce the improved stability, even though bitumens naturally contain varying amounts of native sulfur.

Thus, U.S. Pat. No. 4,145,322, issued Mar. 20, 1979 to Maldonado et al., discloses a process for preparing a bitumen-polymer composition consisting of mixing a bitumen, at 266°–446° F. (130°–230° C.), with 2 to 20% by weight of a block copolymer, having an average molecular weight between 30,000 and 300,000, with the theoretical formula $S_x$–$B_y$, in which S corresponds to styrene structure groups and B corresponds to conjugated diene structure groups, and x and y are integers. The resulting mixture is stirred for at least two hours, and then 0.1 to 3% by weight of sulfur relative to the bitumen is added and the mixture agitated for at least 20 minutes. The preferred quantity of added sulfur cited in this patent is 0.1 to 1.5% by weight with respect to the bitumen. The resulting bitumen-polymer composition is used for road-coating, industrial coating, or other industrial applications.

Similarly, U.S. Pat. No. 4,130,516, issued Dec. 19, 1978 to Gagle et al., discloses an asphalt (bitumen)-polymer composition obtained by hot-blending asphalt with 3 to 7% by weight of elemental sulfur and 0.5 to 1.5% by weight of a natural or synthetic rubber, preferably a linear, random butadiene/styrene copolymer. U.S. Pat. No. 3,803,066, issued Apr. 9, 1974 to Petrossi, also discloses a process for preparing a rubber-modified bitumen by blending rubber, either natural or synthetic, such as styrene/butadiene rubber, with bitumen at 293°–365° F. (145°–185° C.), in an amount up to 10% by weight based on the bitumen, then adjusting the temperature to 257°–320° F. (125°–160° C.), and intimately blending into the mix an amount to sulfur such that the weight ratio of sulfur to rubber is between 0.3 and 0.9. A catalytic quantity of a free-radical vulcanization-accelerator is then added to effect vulcanization. This patent recites the critical nature of the sulfur to rubber ratio, and teaches that weight ratios of sulfur to rubber of less than 0.3 gives modified bitumen of inferior quality.

Although polymer-modified bitumen compositions are known, these previously described compositions are not necessarily useful for road paving applications. For example, mixing North West paving asphalt having an initial viscosity of 682 poise at 140° F. (60° C.) with 3.6 weight percent Kraton ®-4141, a commercially available styrene-butadiene tri-block copolymer which contains 29 weight percent plasticizer oil, and 0.25% sulfur gives a modified-asphalt composition with a viscosity of 15,000 Poise at 140° F. (60° C.). This viscosity, however, greatly exceeds the acceptable viscosity range set by the widely-used AC-20R specification for paving asphalt. This specification, issued by the Federal Highway Administration, requires bitumen compositions to have a viscosity in the range of 1600–2400 Poise at 140° F. (60° C.). Thus, the modified bitumen compositions produced by the procedures of U.S. Pat. No. 4,145,322 using Kraton ®-4141 would be unacceptable for use in road paving under the AC-20R specification.

The second factor which complicates the use of bitumen compositions concerns the viscosity stability of such compositions under storage conditions. In this regard, bitumen compositions are frequently stored for up to 7 days or more before being used and, in some cases, the viscosity of the composition can increase so much that the bitumen composition is unusable for its intended purpose. On the other hand, a storage stable bitumen composition would provide for only minimal viscosity increases and, accordingly, after storage it can still be employed for its intended purpose.

The third factor which complicates the use of bitumen compositions concerns the use of volatile solvents in such compositions. Specifically, while such solvents have been heretofore proposed as a means to fluidize bitumen-polymer compositions containing relatively small amounts of sulfur which compositions are designed as coatings (Maldonado et al., U.S. Pat. No. 4,242,246), environmental concerns restrict the use of volatile solvents in such compositions. Moreover, the use of large amounts of volatile solvents in bitumen compositions may lower the viscosity of the resulting composition so that it no longer meets viscosity specifications designated for road paving applications.

In view of the above, bitumen compositions which simultaneously meet the performance criteria required for road paving and which are substantially free of volatile solvent would be advantageous. Additionally, viscosity stable bitumen compositions would be particularly advantageous.

SUMMARY OF THE INVENTION

The present invention is directed to the discovery that a specific bitumen-copolymer composition which is substantially free of volatile solvent and is formulated to contain requisitely small quantities of sulfur meets the specifications for a bitumen AC-20R composition. Because this composition is substantially free of volatile solvent, environmental concerns relating to hydrocarbon emissions are reduced. Additionally, in most cases, the composition possesses a storage stable viscosity.

The bitumen compositions described herein employ a specific copolymer which is a tri-block copolymer of styrene and a conjugated-diene. Surprisingly, the use of other types of copolymers, including a di-block copolymer of styrene and a conjugated-diene (e.g., styrene-butadiene), do not provide the results evidenced by the compositions of this invention unless a large amount of sulfur is employed.

In this regard, the amount of sulfur employed in the compositions of the present invention is within a very limited range of from about 0.015 to about 0.075 weight percent based on the weight of the total bitumen-copolymer composition. Surprisingly, the use of more than about 0.075 weight percent sulfur in the bitumen-copolymer compositions described herein provide for compositions which fail one or more of the AC20R specifications.

Accordingly, in one of its composition aspects, the present invention is directed to a bitumen-copolymer composition substantially free of volatile solvent and having desired Rheological Properties which composition comprises:

(a) 90 to 98 weight percent of a bitumen having an initial viscosity of from about 600 to about 950 poise at 140° F. (60° C.);

(b) 2 to 10 weight percent of a tri-block copolymer of styrene and a conjugated-diene having an average molecular weight between 30,000 and 300,000; and (c) 0.015 to 0.075 weight percent sulfur, wherein said composition is substantially free of volatile solvent and further wherein the amount of copolymer employed in said composition is sufficient to provide for a bitumen composition possessing the desired Rheological Properties.

In a preferred embodiment, the amount of sulfur employed in the bitumen composition is from about 0.015 to about 0.060 weight percent, and more preferably, from about 0.015 to about 0.050 weight percent sulfur. In addition to meeting the desired Rheological Properties, bitumen compositions containing this amount of sulfur possess a storage stable viscosity.

In another of its composition aspects, the present invention is directed to an aggregate composition comprising aggregate and from about 4 to about 6 weight percent of a bitumen-copolymer composition substantially free of volatile solvent and having desired Rheological Properties which composition comprises:

(a) 90 to 98 weight percent of a bitumen having an initial viscosity of from about 600 to about 950 poise at 140° F. (60° C.);

(b) 2 to 10 weight percent of a tri-block copolymer of styrene and a conjugated-diene having an average molecular weight between 30,000 and 300,000; and (c) 0.015 to 0.075 weight percent sulfur, wherein said composition is substantially free of volatile solvent and further wherein the amount of copolymer employed in said composition is sufficient to provide for a bitumen composition possessing the desired Rheological Properties.

In one of its method aspects, the present invention is directed to a method for preparing a storage stable, bitumen composition substantially free of volatile solvent which method comprises the steps of:

(a) combining from about 90 to 98 weight percent of a bitumen having an initial viscosity of from about 600 to 13 about 950 poise at 140° F. (60° C.) with from about 2 to 10 weight percent of a tri-block copolymer of styrene and a conjugated-diene having an average molecular weight of between 30,000 and 300,000;

(b) mixing said composition at a temperature of from about 300° to about 400° F. (149° to 204° C.) for about 1 to 10 hours;

(c) adding from about 0.03.5 to about 0.060 weight percent of sulfur to the product of (b) above and mixing said product at from about 300° to about 400° F. (149° to 204° C.) for about 1 to 10 hours.

DETAILED DESCRIPTION OF THE INVENTION

The present invention is directed to the discovery that a bitumen composition comprising bitumen and a triblock copolymer of styrene and a conjugated diene (e.g., butadiene) and having from 0.015 to about 0.075 weight percent of sulfur based on the total weight of the composition produces a bitumen composition having properties suitable for applications such as road paving. Additionally, when the amount of sulfur employed in these compositions is about 0.060 or less, the resulting copolymer-bitumen composition also possesses a storage stable viscosity. However, prior to describing this invention in further detail, the following terms will first be defined.

1. Definitions

The term "bitumen" (sometimes referred to as "asphalt") refers to all types of bitumens, including those that occur in nature and those obtained in petroleum processing. The choice of bitumen will depend essentially on the particular application intended for the resulting bitumen composition. Preferred bitumens have an initial viscosity at 140° F. (60° C.) of 600 to 950 poise. The initial penetration range of the base bitumen at 77° F. (25° C.) is 50 to 250 dmm, preferably 75 to 150 dmm, when the intended use of the copolymer-bitumen composition is road paving. Bitumens which do not contain any copolymer, sulfur, etc., are sometimes referred to herein as a "base bitumen".

The term "volatile solvent" refers to a hydrocarbon solvent which has a distillation point or range which is equal to or less than 350° C. Such solvents are known to vaporize to some extent under ambient conditions and, accordingly, pose environmental concerns relating to hydrocarbon emissions.

The term "substantially free of volatile solvent" means that the complete (final) bitumen composition contains less than about 3.5 weight percent of volatile solvent. Preferably, the bitumen composition contains less than about 2 weight percent of volatile solvent and more preferably, less than about 1 weight percent of volatile solvent.

"Conjugated-dienes" refer to alkene compounds having 2 or more sites of unsaturation wherein a second site of unsaturation is conjugated to a first site of unsaturation, i.e., the first carbon atom of the second site of unsaturation is gamma (at carbon atom 3) relative to the first carbon atom of the first site of unsaturation (i.e., —C¹=C²—C³=C⁴— wherein the superscript numbers refer to numbered carbon atoms). Conjugated dienes include, by way of example, butadiene [CH$_2$=CH—CH=CH$_2$], isoprene [CH$_2$=C(CH$_3$)CH=CH$_2$], 1,3-pentadiene [CH$_2$=CH—CH=CH—CH$_3$], and the like.

"Tri-block copolymers of styrene and conjugated-dienes" refer to copolymers of styrene and conjugated-dienes having a linear or radial, tri-block structure consisting of styrene-conjugated diene-styrene block units which copolymers are represented by the formula:

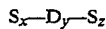

$$S_x—D_y—S_z$$

where D is a conjugated-diene, S is styrene, and x, y and z are integers such that the number average molecular weight of the copolymer is from about 30,000 to about 300,000. These copolymers are well known to those skilled in the art and are either commercially available or can be prepared from methods known per se in the art.

Preferably, such tri-block copolymers are derived from styrene and a conjugated-diene, wherein the conjugated-diene is butadiene or isoprene. Such copolymers preferably contain 15 to 50 percent by weight copolymer units derived from styrene, preferably 25 to 35 percent derived from styrene, more preferably 28 to 31 percent derived from styrene, the remainder being derived from the conjugated diene.

These copolymers preferably have a number average molecular weight range between 50,000 and 200,000, more preferably between 100,000 and 180,000.

The copolymer can employ a minimal amount of hydrocarbon solvent in order to facilitate handling. Examples of suitable solvents include plasticizer solvent which is a non-volatile aromatic oil. However, when the hydrocarbon solvent is a volatile solvent (as defined above), care should be taken to ensure that the amount of solvent contained in the final bitumen composition is less than about 3.5 weight percent.

The term "sulfur" refers to elemental sulfur in any of its physical forms. Preferably, the elemental sulfur is in flake form.

The term "desired Rheological Properties" refers to bitumen compositions having a viscosity at 140° F. (60° C.) of from 1600 to 2400 poise before aging; a toughness of at least 110 inch-pound (127 cm-kilograms) before aging; a tenacity of at least 75 inch-pound (86.6 cm-kilograms) before aging; and a ductility of at least 25 cm at 39.2° F. (4° C.) at 5 cm/min. pull rate after aging. Each of these desired Rheological Properties are necessary parameters in meeting the AC-20(R) specifications for bitumen compositions suitable for use as road pavement material.

Viscosity measurements are made by using ASTM test method D2171; ductility measurements are made by using ASTM test method D113; toughness and tenacity measurements are made by a Benson Method of Toughness and Tenacity, run at 20 inches/minute (50.8 cm/minute) pull rate with a ⅞ inch (2.22 cm) diameter ball.

By "storage stable viscosity" it is meant that the bitumen composition shows no evidence of skinning, settlement, gelation, or graininess and that the viscosity of the composition does not increase by a factor of four or more during storage at 325°±5° F. (163°±2.8° C.) for seven days. Preferably the viscosity does not increase by a factor of two or more during storage at 325° F. (163° C.) for seven days. More preferably the viscosity increases less than 50% during seven days of storage at 325° F. (163° C.).

A substantial increase in the viscosity of the bitumen composition during storage is not desirable due to the resulting difficulties in handling the composition and in meeting product specifications at the time of sale and use.

The term "aggregate" refers to rock and similar material added to the bitumen composition to provide an aggregate composition suitable for paving roads. Typically, the aggregate employed is rock indigenous to the area where the bitumen composition is produced. Suitable aggregate includes granite, basalt, limestone, and the like.

2. Methodology and Synthesis

The bitumen compositions of the present invention are prepared from bitumen, a tri-block copolymer of styrene and a conjugated-diene, and elemental sulfur. Specifically, requisite amounts of bitumen and copolymer are combined such that the copolymer comprises from about 2 to 10 weight percent of the total mixture and preferably from about 2 to 5 weight percent of the total mixture and the bitumen comprises from about 90 to 98 weight percent of the total mixture and preferably from about 95 to 98 weight percent of the total mixture. The specific amount of copolymer employed depends essentially on the initial viscosity of the base bitumen. Greater amounts of copolymer being employed when the initial viscosity of the base bitumen is lower. In any event, the amount of copolymer employed is selected so that the bitumen compositions of this invention possess desired Rheological Properties.

The base bitumen and copolymer are combined generally at a temperature in the range of about 300° to 400° F. (149° to 204° C.). Preferably, the temperature will be in the range of about 320° to 360° F. (160° to 182° C.). Mixing or blending is continued at the above temperature for about 1 to 10 hours, preferably 2 to 4 hours, at which time the mixture is essentially homogenous. At this time, a requisite amount of sulfur is then added and mixing is continued at a temperature in the range of about 300° to 400° F. (149° to 204° C.), preferably 320° to 360° F. (160°–182° C.), for about 1 to 10 hours, preferably for about 2 to 4 hours.

As demonstrated in the examples recited hereinbelow, the resulting bitumen composition has a viscosity, at 140° F. (60° C.), in the range of 1,600 to 2,400 Poise, as measured using ASTM D2171; a minimum toughness of 110 inch-pounds (127 cm-kilogram) and a minimum tenacity of 75 inch-pounds (86.6 cm-kilogram), both measured by the Benson Method of Toughness and Tenacity, run at a 20 inch/minute (50.8 cm/minute) pull rate, using a ⅞ inch (2.2 cm) diameter ball; and a minimum ductility, at 39.2° F. (4° C.), of 25 centimeters as measured using ASTM D113 after Rolling Thin Film Oven ("RTFO") aging using ASTM D1754-83. Surprisingly, if the amount of sulfur employed is greater than about 0.075 weight percent, then the resulting bitumen composition does not possess the desired Rheological Properties recited above. If the amount of sulfur employed is greater than about 0.060 weight percent, then the resulting bitumen composition does not consistently possess storage stable viscosity.

Similarly, the use of tri-block copolymers of styrene and a conjugated diene appears to be essential because bitumen compositions containing di-block copolymers of styrene and a conjugated diene and similar levels of sulfur do not provide for bitumen compositions possessing the desired Rheological Properties recited above. In fact, when di-block copolymers are employed, greater amounts of sulfur are necessary to achieve the desired Rheological Properties.

The bitumen composition is typically mixed with aggregate so as to provide an aggregate composition suitable for use in paving roads. Typically, the aggregate composition comprises from about 4 to 6 weight percent of bitumen composition with the balance of the composition being aggregate.

3. Utility

The bitumen compositions described herein are useful in various types of bitumen applications including paving, industrial, and roofing applications. The composition may be used neat or in emulsified form. Bitumen emulsions are well known in the paving art and comprise water, bitumen (including the copolymer-bitumen composition of the present invention) and surfactants. An especially preferred use for the present composition is in road paving applications in which hot copolymer-bitumen is mixed with hot mineral aggregate to make asphalt concrete mixes.

The advantages of the present invention will be readily apparent from consideration of the following examples. These examples are provided for the purposes of illustration and comparison only and should not be interpreted in any manner as limiting the scope of the present invention.

In these examples, reference is made to AC-20R4 specifications relating to viscosity at 140° F. (60° C.), toughness, tenacity, and ductility at 39.2° F. (4° C.). As noted above, Federal Highway Administration specifications designate a bitumen (asphalt) product AC-20R as meeting defined parameters relating to properties such as viscosity, toughness, tenacity and ductility. The AC-20R4 specifications for these parameters are as follows:

Viscosity at 140° F. (60° C.) = 1600–2400 poise
Ductility at 39.2° F. (4° C.) = at least 25 cm (after aging)
Toughness = at least 110 in.-Lb.(127 cm-kg)
Tenacity = at least 75 in.-Lb.(86.6 cm-kg)

In these examples, the following abbreviations and tradenames have the following meanings:
ASTM—American Society for Testing and Materials
cm—centimeter
°F.—degrees Fahrenheit
°C.—degrees Centigrade
kg—kilogram
KRATON®-4141—a mixture of a linear tri-block copolymer containing 31% styrene-derived and 69% butadiene-derived copolymer units in 29% plasticizer oil. This formulation of KRATON®-4141 is available from Shell Chemical Company, Oak Brook, Illinois.
RTFO—Rolling Thin Film Oven, an aging process which employs ASTM test D1754-83

EXAMPLES

In Examples 1–4, 4.3 weight percent of KRATON®-4141 was mixed using a slow speed stirrer with a base bitumen (asphalt) having an initial viscosity of 850 poise at 140° F. (60° C.) for about 3 hours at 340°–350° F. (171°–177° C.). Elemental sulfur was then added slowly in the amounts indicated in Table I and blending of the sample continued for an additional 3 hours at 340°–350° F. (171°–177° C.). The viscosity, toughness, tenacity and ductility (after RTFO) of the resulting copolymer-bitumen composition was then determined using ASTM D2171 for viscosity, the Benson Method of Toughness and Tenacity, and ASTM D113 for ductility after RTFO. The results for sulfur levels ranging from 0 to 0.075 weight percent are shown in Table I.

TABLE I

| EX. NO. | WT. % SULFUR | VISCOSITY[1] | TOUGHNESS[2] | TENACITY[2] | DUCTILITY[3] | PASS AC-20R[4] |
|---|---|---|---|---|---|---|
| 1 | 0.000 | 1499 | 81 | 56 | 23,23 | No |
| 2 | 0.025 | 1802 | 132 | 103 | 27,32 | Yes |
| 3 | 0.050 | 1856 | 152 | 123 | N/A | Yes |
| 4 | 0.075 | 2111 | 181 | 158 | 27,31 | Yes |

[1]Poise, at 140° F. (60° C.).
[2]Inch-Pounds. To convert to cm-kg, multiply reported values by 1.155
[3]Centimeters, at 39.2° F. (4° C.), after RTFO. Two measurements shown.
[4]Indicates if the example meet the viscosity, toughness, tenacity and ductility after RTFO requirements of the AC-20R specification for road paving.
N/A Not available.

These examples illustrate that in the absence of sulfur, the modified bitumen composition fails to meet one or more of the AC-20R specifications for road paving; and that in the presence of the levels of sulfur recited herein, the modified bitumen composition has a viscosity, toughness, tenacity and ductility after RTFO which meet the requirements of the AC-20R specification.

Examples 5, 6, and 7 were prepared by methods essentially the same as those described above for Examples 1–4. The resulting bitumen composition was maintained at a storage temperature between 320° F. and 330° F. (160° and 166° C.) for 7 days. At the end of the 7 day storage period, the viscosity of the samples was measured at 140° F. (60° C.). The data is shown in Table II presented below:

TABLE II

| EX. | WT. % SULFUR | INITIAL VISCOS- ITY[1] | VISCOSITY[1] AFTER 7 DAYS[2] | PERCENT INCREASE |
|---|---|---|---|---|
| 5 | 0.075 | 1,470 | 10,600 | 626 |
| 6 | 0.050 | 1,404 | 4,333 | 208 |
| 7 | 0.025 | 1,639 | 2,055 | 25 |

[1]Poise, at 140° F. (60° C.).

[2]All samples showed no evidence of skinning, settlement, gelation or graininess after 7 days.

Examples 5, 6 and 7 illustrate that the storage stability of copolymer-bitumen compositions are dependent, in part, upon the amount of sulfur used in its preparation. The viscosity of the copolymer-bitumen compositions of Examples 6 and 7, which were prepared using 0.05 and 0.025 weight percent sulfur respectively, did not increase by a factor of four or more during storage at 325°±5° F. (163°±2.8° C.) for seven days. Thus, Examples 6 and 7 meet the requirements for a bitumen composition possessing a storage stable viscosity. The viscosity of the copolymer-bitumen composition of Example 5, which was prepared using 0.075 weight percent sulfur, increased by more than a factor of four. Therefore, Example 5 did not have a storage stable viscosity.

Example 8 was prepared by methods essentially the same as those described above for Example 2, i.e. using 0.025 weight percent sulfur. The resulting copolymer-bitumen composition was maintained at a storage temperature between 320° F. and 330° F. (160° and 166° C.). Periodically, a sample was drawn and the viscosity measured at 140° F. (60° C.). Prior to drawing the samples, the storage tank was agitated and the tank temperature recorded. The data measured over a 7 day period is shown in Table III.

TABLE III

| STORAGE TIME | TANK TEMPERATURE | VISCOSITY[1,2] | % INCREASE FROM INITIAL |
|---|---|---|---|
| Initial | 340° F. | 1540 | — |
| 14 Hours | 330° F. | 1598 | 4 |
| 21 Hours | 326° F. | 1609 | 4 |
| 2 Days | 320° F. | 1643 | 7 |
| 3 Days | 320° F. | 1794 | 16 |
| 4 Days | 325° F. | 1764 | 15 |
| 5 Days | 330° F. | 1773 | 15 |
| 6 Days | 325° F. | 1908 | 24 |
| 7 Days | 320° F. | 1828 | 19 |

[1]Poise, at 140° F. (60° C.).
[2]All samples showed no evidence of skinning, settlement, gelation or graininess.

Example 8 demonstrates that the copolymer-bitumen of the present invention has a storage stable viscosity, i.e. the viscosity increased by less than 50% over seven days. In Examples 9-13, KRATON ®-4141, was mixed in the amounts indicated in Table IV, at 340°-345° F. (171°-174° C.), with a base bitumen, having an initial viscosity indicated in Table IV, for 3 hours. Elemental sulfur was then added in the amount indicated in Table IV, and mixing continued at 340°-345° F. (171°-174° C.) for 3 hours. The viscosity and toughness of the samples were then determined using the methods of ASTM D2171 and the Benson Method, respectively. The results are shown in Table IV.

TABLE IV

| EX. | WT. % SULFUR | WT. % POLYM. | ASP (1) | VIS (2) | TGH (3) | TEN (4) | DUC (5) | PASS (6) |
|---|---|---|---|---|---|---|---|---|
| 9 | 0.075 | 3.6 | 849 | 1874 | 185 | 162 | 29 | Yes |
| 10 | 0.075 | 4.3 | 849 | 2111 | 181 | 158 | 29 | Yes |
| 11 | 0.075 | 3.6 | 602 | 1384 | 124 | 108 | N/A | No |
| 12 | 0.075 | 4.3 | 602 | 1708 | 161 | 142 | 25 | Yes |
| 13 | 0.0 | 4.3 | 602 | 1082 | 83 | 58 | 39 | No |

(1) Initial viscosity of base bitumen, Poise at 140° F. (60° C.).
(2) Viscosity of Copolymer-Bitumen, Poise at 140° F. (60° C.).
(3) Toughness, in inch-pounds. To convert to cm-kg multiply by 1.155
(4) Tenacity, in inch-pounds. To convert to cm-kg multiply by 1.155
(5) Ductility, centimeters at 39.2° F. (4° C.) after RTFO. Average of two values.
(6) Indicates if the example meets the viscosity, toughness, tenacity, and ductility (after aging) requirements of the AC-20R specification for road paving.
N/A Not available.

The examples in Table IV demonstrate that the amount of copolymer needed to produce a copolymer-bitumen composition with desirable properties is dependent upon the initial viscosity of the base bitumen. In Example 11, the base bitumen has an initial viscosity of 602 poise. Upon addition of 3.6 weight percent copolymer and 0.075 weight percent elemental sulfur, the resulting copolymer-bitumen has a viscosity of 1384 poise, which does not meet viscosity requirements. However, adding 4.3 weight percent copolymer and 0.075 weight percent elemental sulfur, as in Example 12, produced a copolymer-bitumen meeting the AC-30R viscosity specification. For base bitumens having a higher initial viscosity, such as Examples 9 and 10 in which the base bitumen had an initial viscosity of 849 poise, adding either 3.6 or 4.3 weight percent copolymer and 0,075 weight percent elemental sulfur produced a copolymer-bitumen meeting the AC-20R viscosity specification. Example 13, in which no sulfur was added, further illustrates that the addition of sulfur is required to produce a copolymer-bitumen which meets road paving specifications.

In Examples 14-16, 3.6 weight percent of KRATON ®-4141 was mixed with a base bitumen having an initial viscosity of 682 poise at 140° F. (60° C.), for about 3 hours at 340° to 345° F. (171°-174° C.). Elemental sulfur was then added in the amounts indicated in Table V below and mixing continued at 340° to 345° F. (171°-174° C.) for about 3 hours. The viscosity of the resulting copolymer-bitumen composition was then determined using the methods of ASTM D2171. The results for sulfur levels ranging from 0.05 to 0.25 weight percent are shown in Table V below:

TABLE V

| EXAMPLE | WT. PERCENT SULFUR | VISCOSITY AT 140° F. POISE |
|---|---|---|
| 14 | 0.05 | 1320 |
| 15 | 0.10 | 5400 |
| 16 | 0.25 | 15000 |

Examples 15 and 16 in Table V illustrate that sulfur levels of 0.1 and 0.25% produce a copolymer-bitumen composition with a viscosity which does not meet the requirements of the AC-20R specification, i.e. the viscosity exceeds the range of 1600 to 2400 poise at 140° F. (60° C.). Example 14 further illustrates that base bitumens with low initial viscosities require higher copolymer levels. In this example, 3.6 weight percent copolymer and 0.05 weight percent elemental sulfur were not sufficient to produce a copolymer-bitumen composition which meets the AC-20R viscosity requirement.

By following the procedures set forth above, other tri-block copolymers can be employed in place of KRATON®-4141 by merely substituting such tri-block copolymers for KRATON®-4141. Such other tri-block copolymers include, by way of example, copolymers of styrene-butadiene having molecular weights and/or ratios of styrene to butadiene different from KRATON®-4141, copolymers of styrene-isoprene, styrene-2,4-pentadiene and the like.

What is claimed is:

1. A bitumen-copolymer composition comprising:
   (a) 90 to 98 weight percent of a bitumen having an initial viscosity of from about 600 to about 950 poise at 140° F.;
   (b) 2 to 10 weight percent of a tri-block copolymer of styrene and a conjugated-diene having an average molecular weight between 30,000 and 300,000; and
   (c) 0.015 to 0.075 weight percent sulfur derived from extraneous elemental sulfur,
   wherein said composition is substantially free of volatile solvent and said composition has a viscosity at 140° F. (60° C.) of from 1600 to 2400 poise before aging; a toughness of at least 110 inch-pound (127 cm-kilograms) before aging; a tenacity of at least 75 inch-pound (86.6 cm-kilograms) before aging; and a ductility of at least 25 cm at 39.2° F. (4° C.) at 5 cm/min. pull rate after aging and further wherein the amount of copolymer employed in said composition in sufficient to provide for a bitumen composition possessing said viscosity, toughness, tenacity and ductility properties.

2. A bitumen-copolymer composition as described in claim 1 wherein the conjugated-diene is selected from the group consisting of isoprene and butadiene.

3. A bitumen-copolymer composition as described in claim 2 wherein the conjugated-diene is butadiene.

4. A bitumen-copolymer composition as described in claim 1 wherein the amount of sulfur is from about 0,015 to about 0.060 weight percent.

5. A bitumen-copolymer composition as described in claim 4 wherein the amount of sulfur is from about 0,015 to about 0.050 weight percent.

6. A bitumen-copolymer composition as described in claim 1 wherein the amount of copolymer is from about 2 to about 5 weight percent.

7. A bitumen-copolymer composition as described in claim 6 wherein said copolymer comprises from about 15 to 50 percent by weight styrene.

8. An aggregate composition comprising aggregate and from about 4 to about 6 weight percent of a bitumen-copolymer composition comprising:
   (a) 90 to 98 weight percent of a bitumen having an initial viscosity of from about 600 to about 950 poise at 140° F.;
   (b) 2 to 10 weight percent of a tri-block copolymer of styrene and a conjugated-diene having an average molecular weight between 30,000 and 300,000; and
   (c) 0.015 to 0.075 weight percent sulfur derived from extraneous elemental sulfur,
   wherein said composition is substantially free of volatile solvent and said composition has a viscosity at 140° F. (60° C.) of from 1600 to 2400 poise before aging; a toughness of at least 110 inch-pound (127 cm-kilograms) before aging; a tenacity of at least 75 inch-pound (86.6 cm-kilograms) before aging; and a ductility of at least 25 cm at 39.2° F. (4° C.) at 5 cm/min. pull rate after aging and further wherein the amount of copolymer employed in said composition is sufficient to provide for a bitumen composition possessing said viscosity, toughness, tenacity and ductility properties.

9. An aggregate composition as described in claim 8 wherein the conjugated-diene is selected from the group consisting of isoprene and butadiene.

10. An aggregate composition as described in claim 9 wherein the conjugated-diene is butadiene.

11. An aggregate composition as described in claim 8 wherein the amount of sulfur is from about 0.015 to about 0.060 weight percent.

12. An aggregate composition as described in claim 11 wherein the amount of sulfur is from about 0.015 to about 0.050 weight percent.

13. An aggregate composition as described in claim 8 wherein the amount of copolymer is from about 2 to about 5 weight percent.

14. An aggregate composition as described in claim 13 wherein said copolymer comprises from about 15 to 50 percent by weight styrene.

15. A method for preparing a storage stable, bitumen composition substantially free of volatile solvent which method comprises the steps of:
   (a) combining from about 90 to 98 weight percent of a bitumen having an initial viscosity of from about 600 to about 950 poise at 140° F. with from about 2 to 10 weight percent of a tri-block copolymer of styrene and a conjugated-diene having an average molecular weight of between 30,000 and 300,000;
   (b) mixing said composition at a temperature of from about 300° to 400° F. for about 1 to 10 hours;
   (c) adding from about 0.015 to about 0.060 weight percent of sulfur to the product of (b) above and mixing said product at from about 300° to about 400° F. for about 1 to 10 hours.

16. A method as described in claim 15 wherein the conjugated-diene is selected from the group consisting of isoprene and butadiene.

17. A method as described in claim 16 wherein the conjugated-diene is butadiene.

18. A method as described in claim 15 wherein the amount of elemental sulfur is from about 0.015 to about 0.050 weight percent.

19. A method as described in claim 8 wherein the amount of copolymer is from about 2 to about 5 weight percent.

20. A method as described in claim 19 wherein said copolymer comprises from about 15 to 20 percent by weight styrene.

* * * * *